No. 784,628. PATENTED MAR. 14, 1905.
L. E. McGOVNEY.
POTATO BUG PICKER.
APPLICATION FILED APR. 9, 1904.
2 SHEETS—SHEET 2.
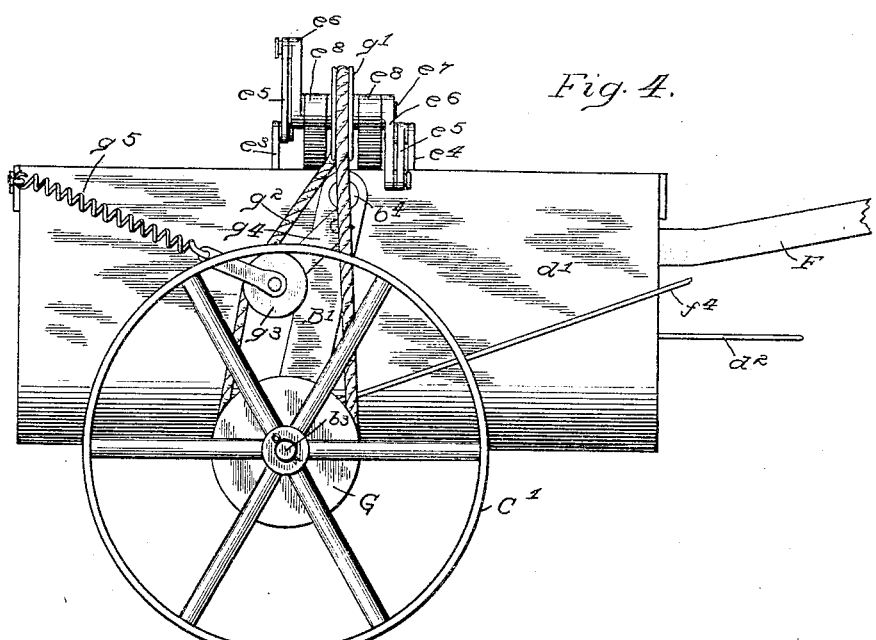
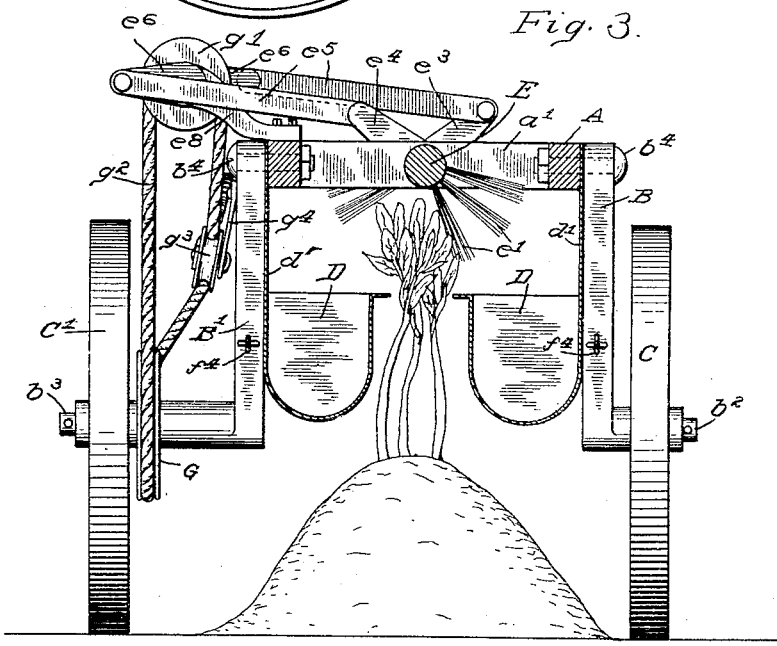
Witnesses:
John Braunwalder.
L. G. Snow.
Inventor:
Lewis E. McGovney
By Frederick Benjamin
Att'y.

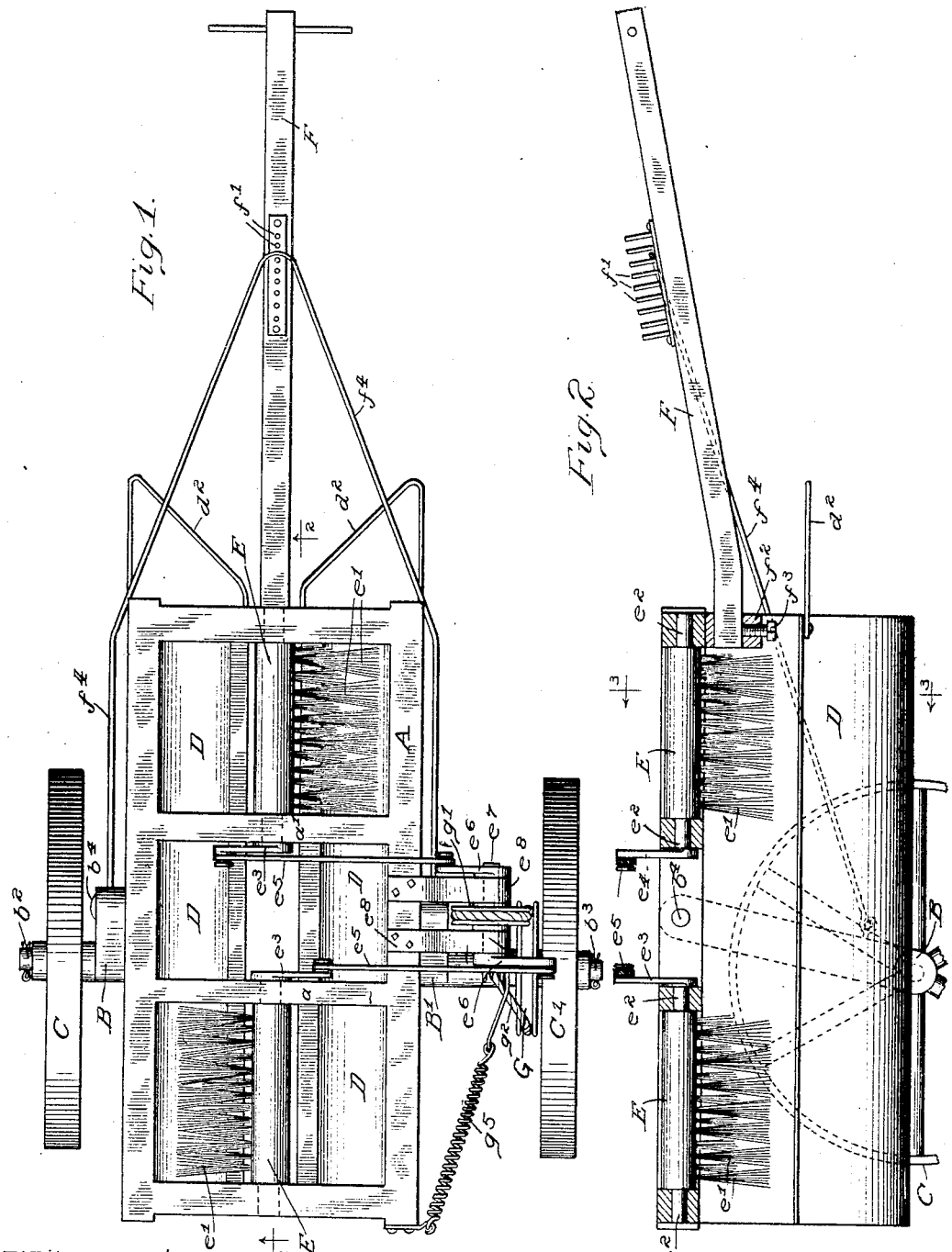

No. 784,628. Patented March 14, 1905.

UNITED STATES PATENT OFFICE.

LEWIS E. McGOVNEY, OF MOKENA, ILLINOIS.

POTATO-BUG PICKER.

SPECIFICATION forming part of Letters Patent No. 784,628, dated March 14, 1905.

Application filed April 9, 1904. Serial No. 202,424.

*To all whom it may concern:*

Be it known that I, LEWIS E. McGOVNEY, a citizen of the United States, residing at Mokena, in the county of Will and State of Illinois, have invented certain new and useful Improvements in Potato-Bug Pickers, of which the following is a specification.

This invention relates to improvements in machines for brushing, picking, or knocking potato-bugs from potato-vines or removing insects from other vegetable foliage.

The especial object of the invention is to provide a device that can be drawn or propelled along the rows in which the plants are growing, so that the machine will straddle the plants, and in which a series of oscillating brushes will come in contact with the foliage of the plants and brush or knock therefrom the bugs into troughs carried by the machine, from which troughs the bugs may be removed from time to time or into which receptacles may be placed any suitable liquid adapted to kill the bugs.

A special object is to provide in such a device means for gathering and guiding the foliage so that it will be effectually acted upon by the brushes and at the same time will not be injured by coming in contact with the machine.

While my machine is shown in the accompanying drawings as especially adapted to be drawn by hand, it will be apparent that by making the same large enough it can be drawn by a team and can be used on brushes or plants of any size.

In the accompanying drawings, which form a part of this application, Figure 1 is a top plan view of my machine complete. Fig. 2 is a view on the line 2 2 of Fig. 1. Fig. 3 is a cross-section on the line 3 3 of Fig. 2. Fig. 4 is a side elevation of the machine proper.

Referring to the drawings in detail, A represents a rectangular frame in which are cross-bars $a'$ $a'$, said frame furnishing a support or carrier for the operative parts of the machine. Pivoted to the sides of the frames, on the bolts $b^4$ $b^4$, are hangers B B', in which are mounted, respectively, axles $b^2$ $b^3$. On these axles are mounted ground-wheels C C', the latter furnishing means for driving the axle $b^3$, on which is mounted a grooved pulley G. Suitably secured to the outer sides of the frame A are bug-receiving troughs D D, having vertical sides $d'$ $d'$, the upper edges of which are attached to the frame. The inner edges of the troughs are spaced apart a sufficient distance to permit to pass therebetween the potato or other plants upon which the device is being used. To provide for the adjustment at different heights of the frame A, and the troughs secured thereto, from the ground, I secure to the hangers B B' a bent wire frame $f^4$, the forward portion of which rests upon the tongue F, which is secured to the under side of the frame by bolt $f^3$, as shown in Fig. 2. On the upper side of the tongue are a series of pins $f'$, between which the forward portion of the wire frame $f^4$ is adapted to rest and be held against displacement. It will be apparent that by adjusting the frame $f^4$ back and forth along the upper side of the tongue to the extent permitted by the series of pins $f'$ the angle of the hangers B B' relative to the frame will be changed, and hence the distance of the frame from the ground will be altered accordingly.

Extending longitudinally on the frame between the ends of same and the cross-bars $a'$ are cylindrical brush-holders E E, the ends of which are provided with bearings $e^2$ $e^2$ and also provided with bristles $e'$, which are so set relative to the two holders that the bristles extend downwardly and outwardly toward opposite sides of the frame A. At the inner end of the brush-holders are secured crank-arms $e^3$, which are pivotally connected at their upper ends with the rods or links $e^5$, the opposite ends of which are pivotally connected with other crank-arms $e^6$ $e^6$, the inner ends of which are mounted on the shaft $e^7$, which is suitably journaled in the outer ends of brackets $e^8$, the inner ends of which are bolted to one side of the frame A. These brackets extend upwardly and outwardly from the frame, and mounted on the shaft $e^7$ between the brackets is a pulley $g'$, over which is arranged and travels an endless cord or rope $g^2$, which also travels over the grooved pulley G. It will be seen that the grooved pulleys G $g'$ are at right angles to each other. Hence the rope $g^2$ is crossed, as shown, and in order to hold the rope under proper tension I provide a tension groove-pulley $g^3$, which is mounted on a shaft journaled in the lower end of a hanger $g^4$. Said tension-pulley is held by a coil-spring $g^5$, one end of which is secured at the rear corner of the frame A, all as shown in Figs. 1 and 4.

Extending forwardly of the body of the device and secured to the inner edges of the troughs D D are wire yokes $d^2$ $d^2$, bent to converge, as shown in Fig. 1, whereby foliage of the plants will be drawn toward the center and into the space between the inner edges of the troughs D, thus gathering the foliage in position to be most effectively reached by the bristles $e^7$ of the oscillating brush-holders E.

From the construction above described it will be seen that upon the machine being drawn forward the rotation of the axle $b^3$ from the turning of the wheel G' will be communicated to the grooved pulley G, will cause the cable $g^2$ to travel over the disk $g'$, and thereby drive the crank-arms $e^6$, which are fixed on the shaft of the pulley $g'$, and from said crank-arms power will be communicated, through the links or rods $e^5$, to the crank-arms $e^3$, which are fixed on the inner ends of the brush-holders E, with the result that said brush-holders will be oscillated and the bristles thereof, which extend downwardly and outwardly from the holders, will be driven back and forth over the foliage and over the tops of the troughs D, thereby knocking or brushing from the foliage into the troughs such bugs as may be thereon.

The brushing means secured to the holders may be twigs, strips of stiff cloth, or other substitutes for bristles.

Having thus described my invention, what I claim as new, and desire to secure by Letters Patent, is—

1. In a machine of the class described, a brush-carrying frame, draft means connected with said frame, hangers secured to and supporting said frame, and adjustable means connecting said hangers with said draft element, whereby the height of the frame above the ground may be regulated.

2. In a machine of the class described, a frame, brushes mounted on said frame, means for operating said brushes, hangers secured to and supporting said frame, a tongue secured to said frame, a rod secured to said hangers and means on said tongue for engaging said rod whereby the latter may be adjusted relative to the tongue, for the purpose described.

3. In a machine of the class described, a supporting-frame, a tongue secured to the frame, adjustable hangers secured to said frame, ground-wheels carrying said hangers, means for adjusting said hangers from said tongue, bug-receiving troughs supported under said frame, brushes mounted above said troughs, and means for operating said brushes for the purpose described.

In testimony whereof I affix my signature in presence of two witnesses.

LEWIS E. McGOVNEY.

Witnesses:
F. BENJAMIN,
GERTRUDE PUDDICOMBE.